United States Patent Office 2,982,280
Patented May 2, 1961

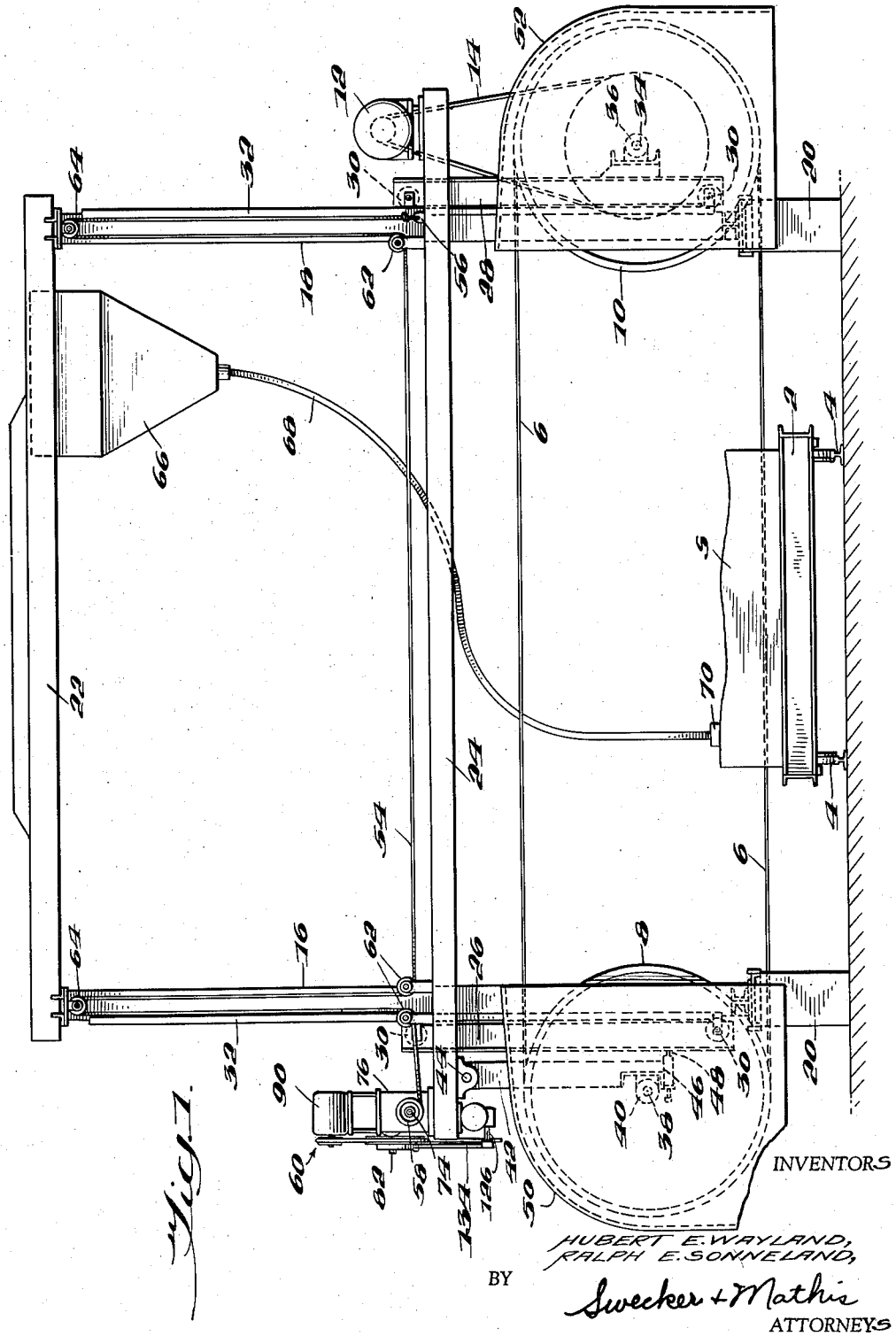

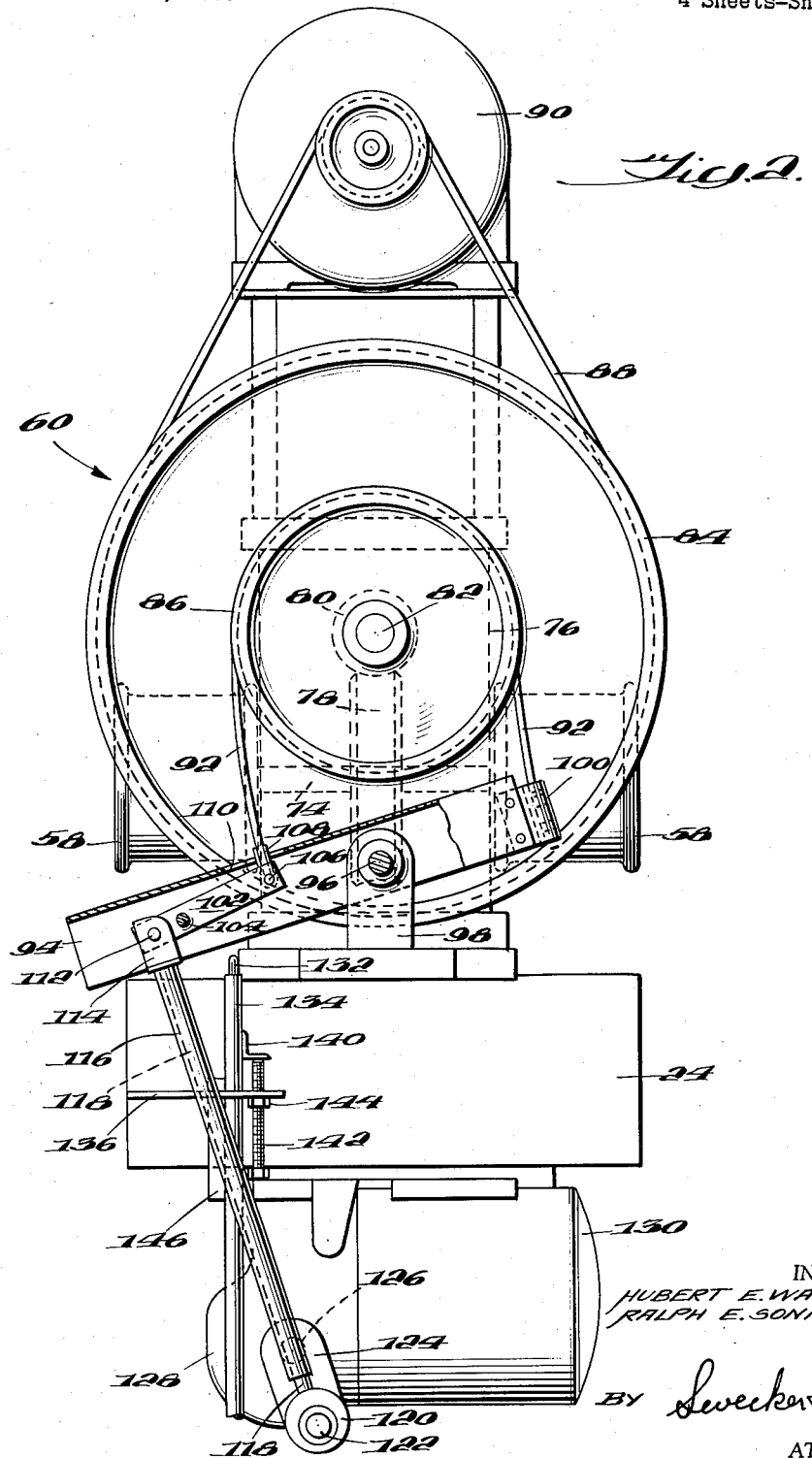

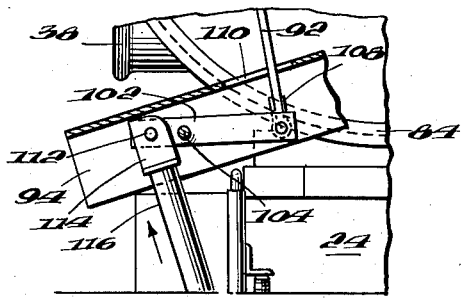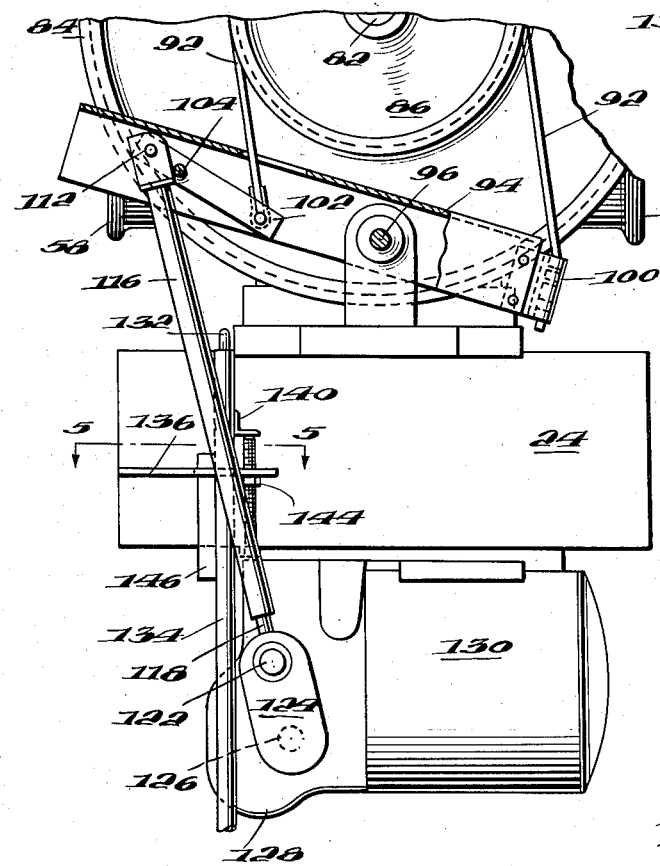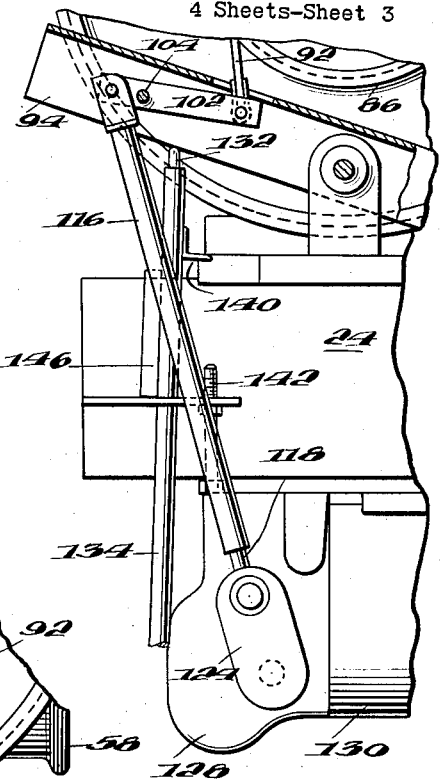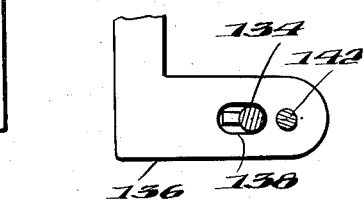

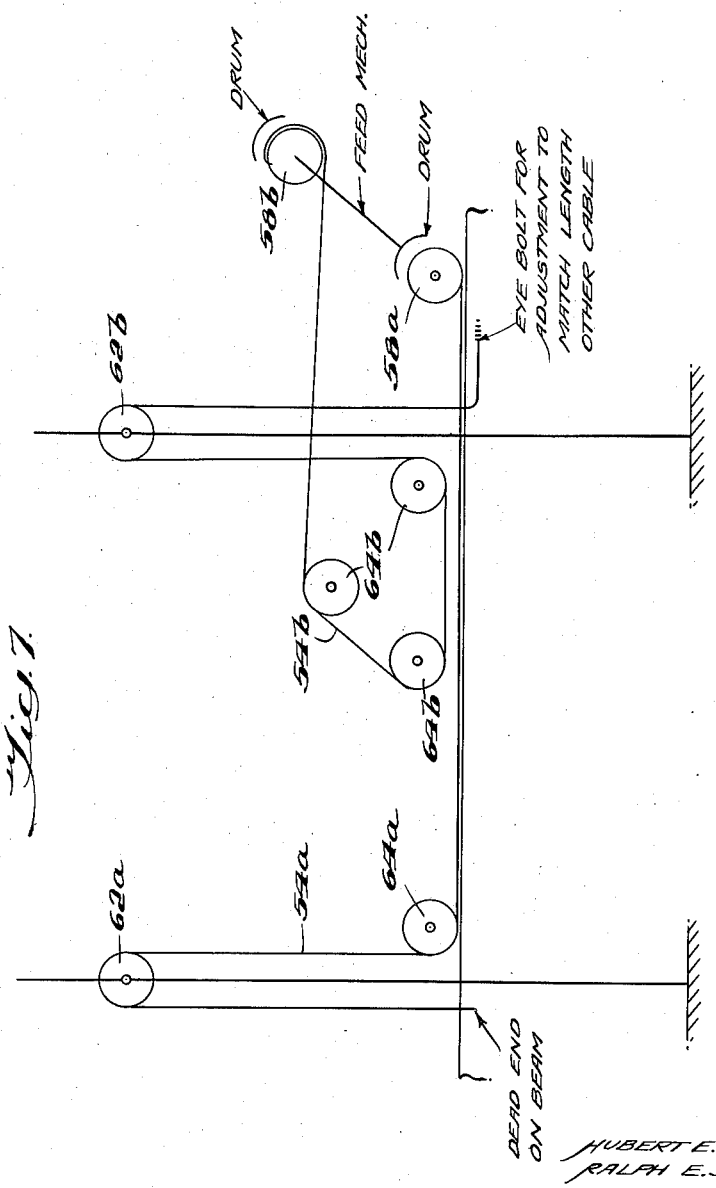

2,982,280

STONE CUTTING APPARATUS

Hubert E. Wayland and Ralph E. Sonneland, Knoxville, Tenn., assignors to Ty-Sa-Man Machine Company, Knoxville, Tenn., a corporation of Tennessee Filed Mar. 25, 1958, Ser. No. 723,728

11 Claims. (Cl. 125—21)

This invention relates to cutting apparatus, and more particularly to an improved feed control for regulating the rate at which the cutting means of a stone saw is advanced into the stone being cut thereby.

Although the present invention is applicable to various types of cutting apparatus, it will be convenient to describe it herein in association with a typical wire saw installation. Such saws have been used extensively over a period of many years, and they are familiar to all who are concerned with the cutting of stone on a commercial basis. They may be used to cut sandstone, concrete, marble, granite, glass, carbon, and other materials which are susceptible to the cutting action of a rolling abrasive.

A typical wire saw usually includes some means for positioning and supporting a block of stone to be cut, means for supplying particulate abrasive to the stone, one or more twisted strands of wires for rolling the abrasive particles against the stone, guides for supporting the wires and guiding them along paths which include cutting runs extending across the stone being cut, and feed means for moving the guides and the wires carried thereby in a direction at an angle to the cutting runs of the wires to increase gradually the depth of the cuts produced in the stone. The present invention is concerned primarily with such feed means.

The rate at which the cutting of stone may be effected by a wire saw is a complex function of many variables, such for example, as the consistency of the stone itself, the consistency of the abrasive, and the pressure of the saw wires against the bases of the cuts. Moreover, the variations in some of these factors are quite irregular. Variations in consistency have been noted in different portions of a single block, and different blocks from the same quarry frequently are of different consistencies.

Of these variables, the one that may be regulated by the operator of a wire saw, is the pressure of the wires against the bottoms of the cuts being formed in the stone. If the feed mechanism on a machine is operated in such a manner as to advance the wires into the work faster than the cutting is being accomplished, the pressure of the wires against the bottoms of the cuts will increase. On the other hand, if the feed mechanism is operated so as to advance the wires at a rate slower than the rate at which cutting might take place, the pressure of the wires against the stone will decrease. Hence it will be seen that, if the rate of feed of the wires into the stone is regulated properly, it is possible for the operator of a wire saw to keep the machine operating at the maximum rate permitted by the consistency of the material being cut, the consistency of the abrasive employed, and the tension characteristics of the wires.

Various proposals have been advanced heretofore with respect to variable feed controls for the wires of wire saws. As an example, reference may be made to U.S. Patent 2,674,238, granted to Dessureau et al. on April 6, 1954. However, none of these has been entirely satisfactory in use. One important objection to these prior controls has been that the adjustments necessary for changing the feed rate could be made only when the feed had been stopped. When the machine was actually running, the adjustable elements themselves moved, and effective control over them is impossible.

In the cutting of stone, this objection is a serious one, because the desirable rate of feed can be determined only as a matter of judgment on the part of an operator observing the operation of the equipment. Unless the rate of feed can be controlled simultaneously with the making of observations as to the effects produced, it is very difficult to obtain optimum settings, and the procedure is an awkward one involving costly, time-consuming interruptions in the production cycle of the machine.

It is an object of this invention to overcome the disadvantages and objections noted above, and to provide an improved feed control mechanism which can be regulated conveniently while in operation to vary the rate of feed.

Another object of this invention is to provide stone cutting apparatus with simple and durable mechanical means for controlling the rate of feed of the cutting device into the stone being cut thereby and in which such means may be actuated at any time during the operating cycle of the apparatus.

A more specific object of this invention is to provide a feed control mechanism which can be regulated to control the rate of feed by an adjustable element mounted upon a relatively stationary part of the apparatus, so that the operator may manipulate the adjustable element even when the mechanism is in operation.

The foregoing objects may be accomplished, according to a preferred embodiment of the invention, by the provision of a feed control mechanism in which the driving and driven parts are operatively connected together through a drive element which moves back and forth along a predetermined path of regulatable length, and in which the actual driving effect produced by such drive element is a function of the length of its path of movement. Close control over the effective length of the path of movement of the drive element is accomplished by disposing an adjustable abutment adjacent one end of such path. When the operator moves the abutment in one direction, the effective length of the path is reduced, and when the operator moves the abutment in the opposite direction, the effective length of the path is increased.

Since the adjustable abutment is not a part of the linkage connecting the driving and driven parts of the feed control mechanism, it need not move when the mechanism is in operation. Thus, the abutment serves as a stationary control device which can be adjusted by the operator of the machine at any time.

This feature of the invention is very important in stone sawing operations. A skilled operator of stone cutting apparatus embodying the present invention can set the apparatus in operation, observe the progress of the cutting implement into the stone, and then regulate the rate of feed so as to compensate for any discrepancies between the conditions which actually exist and those required for optimum cutting efficiency.

A better understanding of the construction and advantages of the present invention will be gained from a consideration of the following detailed description of an embodiment thereof illustrated in the accompanying drawings, in which:

Fig. 1 is a side elevational view of a wire saw embodying the present invention;

Fig. 2 is an end elevational view with certain parts broken away, of the feed control mechanism shown at the left in Fig. 1;

Fig. 3 and Fig. 4 are partial views similar to Fig. 2, but showing certain parts of the mechanism in the positions they occupy at different points in the operating cycle;

Fig. 5 is a detail cross sectional view taken along the line 5—5 in Fig. 4;

Fig. 6 is a view similar to Fig. 4, but illustrating the positions assumed by the parts when the feed mechanism is inactivated; and Fig. 7 is a diagrammatic view of another form of motion transmitting means for the wire saw.

In Fig. 1, a block of stone S being cut is shown in position upon a carriage 2 which may be moved along tracks or guides 4 extending transversely of the machine. The carriage 2 normally is held stationary during cutting operations. But it may be moved along the tracks 4 before or after the cutting operation to facilitate the handling and positioning of the stone S.

The stone S may be severed along one or more vertical planes, and in Fig. 1, it is assumed that a cutting operation has been begun but has not been completed. The planes of the cuts in the stone S are established by one or more saw wires 6 which are driven along endless paths extending across the carriage 2. Only one wire 6 is shown in Fig. 1, but it will be obvious to persons skilled in the art that the machine may include several of these wires. Additional wires would be disposed behind the wire 6 in Fig. 1 and would not be visible in this view.

Each saw wire 6 is looped about guide wheels 8 and 10 disposed on opposite sides of the stone S to be cut and is guided thereby along a closed path the lower run of which may be brought into contact with the stone S. The wires 6 are driven along this path by a suitable electric motor 12 driving to the guide wheel 10 by a V-belt 14 or other suitable means.

The main frame of the machine includes a pair of stationary uprights 16 and 18 adjustably mounted on stationary piers or foundation elements 20 resting upon the ground or some other support surface at locations on opposite sides of the carriage 2. The upper ends of the uprights 16 and 18 are rigidly connected together by a cross beam 22 to enhance the overall strength and rigidity of the main frame.

The main frame serves to support and guide a movable frame unit made up of a horizontal platform 24 and depending struts or brackets 26 and 28 disposed adjacent the outer faces of the uprights 16 and 18, respectively. Suitable openings in the platform 24 receive the uprights 16 and 18 and permit vertical movements of the platform 24 along the uprights 16 and 18. During such movements, the movable frame unit is guided by rollers 30 mounted upon the brackets 26 and 28 in position to cooperate with tracks 32 carried by the outer faces of the uprights 16 and 18.

It is preferred that the motor 12 and the axis of the guide wheel 10 be fixed relative to the movable frame unit. To this end, the motor 12 is supported upon the platform 24, and the wheel 10 is supported by the depending bracket 28. A shaft 34 to which the wheel 10 is secured, is carried by a bearing 36 fixed rigidly to the bracket 28.

However, the wheel 8 is mounted for swinging movements relative to the movable frame unit so that the tension in the wires 6 may be adjusted when necessary. A shaft 38 for supporting the wheel 8 is mounted in a suitable bearing 40 which is attached to a pendulum 42 pivoted at 44 to the platform 24 of the movable frame unit. At its lower end, the pendulum 42 carries an adjustable spring tension assembly 46 of a type well-known in the art. A plunger 48 protrudes from the front end of this assembly in position to bear against the adjacent surface of the depending bracket 26. Normally the spring within the assembly 46 tends to urge the pendulum 42 away from the bracket 26 to increase the length of the path which must be assumed by the saw wires 6 looped around the guide wheels 8 and 10. The force of the spring in the assembly 46 may be adjusted as desired to regulate the tension in the wires 6.

Also mounted upon the movable frame unit are wheel guards 50 and 52 which cover the major portions of the peripheries of the guide wheels 8 and 10. These guards are provided as safety precautions, and they may be of any suitable configuration.

The movable frame unit is supported upon the main frame of the machine by a pair of cables 54, only one of which is visible in Fig. 1. The other cable is disposed on the opposite side of the machine. Its path is identical to that of the cable 54 in Fig. 1. Each cable 54 is fixed at one end to the platform 24 by a suitable fitting 56, and its opposite end is wound upon a drum 58 which forms the output element of a feed control mechanism 60 to be described in greater detail below. Intermediate its ends, each cable 54 is guided by pulleys 62 and 64 attached respectively to the movable frame unit and the main frame of the machine.

When the feed control mechanism 60 is actuated so as to wind the cables 54 upon the drums 58, the effective lengths of the cables 54 are decreased so that the movable frame unit moves upwardly along the uprights 16 and 18 of the main frame of the machine. Then, when the feed control mechanism 60 is reversed, the movable frame unit is permitted to descend along the uprights 16 and 18 under the influence of gravity.

An alternative arrangement for supporting the movable frame unit upon the main frame of the machine is illustrated diagrammatically in Fig. 7 of the drawings. In this view, two cables 54a and 54b cooperate with drums 58a and 58b driven by a feed mechanism such as the feed mechanism 60. The cables 54a and 54b are anchored to the platform 24, pass around pulleys 62a, 64a, 62b, 64b, and are connected to the drums 58a and 58b of the feed mechanism. In order that the lengths of the two cables 54a and 54b may be equalized, one of them should be connected to the platform 24 through an adjustable element such as an eyebolt. Since each cable makes only one pass about a pulley 62a or 62b in extending from the platform 24 to its cable winding drum, the amount of winding which is required in order to move the platform 24 a given distance along the main frame of the machine is materially less than that required in the embodiment illustrated in Fig. 1, and small diameter drums may be employed, if desired.

In all of the wire saws in use today, the actual cutting of the stone is accomplished by feeding a mixture of water and particulate abrasive to the cutting runs of the wires 6. The wires themselves are twisted structures having a number of inclined surfaces that engage the abrasive particles and rub them against the stone S to effect the cutting. As the depths of the cuts in the stone S increase, the movable frame unit is permitted to move downwardly at a controlled rate to keep the cutting runs of the wires 6 in contact with the bottoms of the cuts until the stone S has been completely severed.

In Fig. 1, the abrasive mixture is supplied from a suitable chamber 66 attached to the cross beam 22 of the main frame of the machine. The mixture passes from the lower end of the chamber 66 through a flexible conduit 68 to a distribution block 70 attached to the upper face of the stone S. It will be understood, of course, that there are as many conduits 68 and distribution blocks 70 as there are cutting runs of the wires 6. Each block 70 is positioned immediately adjacent to the plane of movement of the cutting run of a wire 6, and feeds abrasive directly into the cuts being formed thereby.

The present invention is concerned primarily with the feed control mechanism 60. The construction of this mechanism is clearly shown in Figs. 1 and 2 and reference should be made to these views. The cables 54 have been omitted in Fig. 2 in the interest of clarity, but from Fig. 1, it will be evident that these cables are wound upon the drum 58.

The cable winding drums 58 are connected to a common shaft 74 mounted for rotation in a suitable housing 76. A worm wheel 78 is fixed to a central portion of the shaft 74 within the housing 76 in position to cooperate with a worm 80 on a suitable drive shaft 82. The drive shaft 82 is rotatably mounted in the housing 76 and protrudes from the left end of the housing 76 as viewed in Fig. 1.

Normally, the friction between the parts will be sufficient to prevent unwinding of the cables 54 under the influence of the weight of the movable frame unit. If it were found in some particular installation that the cables tended to unwind too freely, this could be corrected by simply applying a light braking action to the shaft 82 by any suitable means.

The protruding end portion of the drive shaft 82 has fixed thereto a large pulley 84 and a smaller pulley 86. The large pulley 84 cooperates with a V-belt 88 adapted to be driven by an electric motor 90 of conventional construction. The motor 90 provides power for elevating the movable frame unit of the machine after a cutting operation has been completed. When actuated, the motor 90 drives the cable winding drums 58 in a direction such that the cables 54 will be wound thereon. Power is transmitted from the motor 90 to the drums 58 by the V-belt 88, the pulley 84, the shaft 82, the worm 80, the worm wheel 78, and the shaft 74, in a manner which will be apparent from an inspection of Fig. 2.

The smaller pulley 86 on the protruding end of the drive shaft 82 cooperates with a belt 92 which may be either a V-belt or a flat belt. In either event, the periphery of the pulley 86 should be shaped so that no substantial frictional forces are developed between the side walls of its groove and the edges of the belt 92. As will become apparent hereinafter, the pulley 86 should be free to rotate relative to the belt 92 when the belt 92 is slack, and this result can best be achieved where there is no binding engagement between the edges of the belt 92 and the side walls of the peripheral groove in the pulley 86.

A drive element, illustrated as a rocker arm 94, cooperates with the belt 92 under certain circumstances to drive the pulley 86 in a direction opposite to that in which the large pulley 84 is driven by the motor 90. The rocker arm 94 is pivotally mounted upon a horizontal shaft 96 carried by a stationary bracket 98, and is free to swing about its pivot 96 in a vertical plane.

One end of the belt 92 is fixed to an end of the rocker arm 94 by a conventional clamp device 100. The opposite end of the belt 92 also is connected to the rocker arm 94, but the connections are more indirect. An engagement arm 102 pivotally mounted upon the rocker arm 94 by a pivot pin 104 is pivotally connected at 106 to a small clamp 108 attached to the end of the belt 92. The effective length of the belt 92 may be adjusted by varying the position of its end disposed within the clamp 100, in a manner which will be apparent.

In the preferred form of the invention, the rocker arm 94 is channel-shaped in transverse cross section. This construction permits the loads on the shaft 96 and the pivot pin 104 to be balanced properly so as to prevent twisting of the components. It also offers some protection for the engagement arm 102 disposed therein. The clamp 108 on the left end of the belt 92 passes through an elongated slot 110 in the top wall of the rocker arm 94.

The outer end portion of the engagement arm 102 is pivotally connected at 112 to the upper end of a telescoping linkage comprising a head 114, a tube 116, and a rod 118 of greater length than the tube 116. The rod 118 is disposed within the tube 116 and is adapted to abut against the head 114. A bearing 120 is fixed to the lower end of the rod 118 and cooperates with a crank pin 122 carried by a crank 124. The crank 124 is fixed to an output shaft 126 of a conventional gear reduction system 128 driven by a suitable electric motor 130.

The effects produced upon energization of the motor 130 will be evident from a comparison of Figs. 2, 3, and 4. Fig. 2 illustrates the lowermost position of the rod 118. In this position, the crank 124 and the rod 118 are in alignment, and the crank pin 122 is below the shaft 126. Fig. 3 illustrates the effects produced when the crank 124 is rotated slightly from the position shown in Fig. 2, to cause a small amount of upward movement of the rod 118. Fig. 4 represents the completion of one-half of a revolution by the crank 124.

In Fig. 2, it will be seen that the belt 92 is slack. This is so because the engagement arm 102 has been rotated in a counter-clockwise direction as far as possible by the weight of the head 114 and the pipe 116 of the extensible linkage connected to its outer end.

The initial movements of the crank 124 from the position illustrated in Fig. 2 cause the rod 118 of the telescoping linkage to bear against the head 114 to elevate the pivot 112. As the pivot 112 moves upwardly, the engagement arm 102 swings in a clockwise direction about its pivot pin 104 to tighten the belt 92. By referring to Fig. 3, it will be evident that this tightening of the belt 92 takes place without accompanying movements of the rocker arm 94.

After the engagement arm 102 has assumed the position shown in Fig. 3, further upward movements of the rod 118 of the telescoping linkage result in the application of force to the rocker arm 94 through the pivot pin 104 for the engagement arm 102, and the rocker arm 94 swings about its shaft 96 in a clockwise direction. During this movement, the already tightened belt 92 remains tight, and applies a driving force to the small pulley 86 on the protruding end of the drive shaft 82 to rotate the drive shaft in such a direction as to cause unwinding of the cables 54 on the drums 58.

Just after the crank 124 moves beyond the position illustrated in Fig. 4, the rod 118 begins to move downwardly again, and the engagement arm 102 swings in a counter-clockwise direction about its pivot 104 to slacken the belt 92 sufficiently to prevent the transmission of driving forces to the pulley 86 during the subsequent counter-clockwise stroke of the rocker arm 94. Hence, during the counter-clockwise strokes of the rocker arm 94, the drive shaft 82 of the mechanism will remain stationary.

It should be noted particularly that the driving effect produced by the motor 130 is an interrupted one. The shaft 82 moves during a portion only of each revolution of the crank 124. During the remaining portions of each revolution of the crank 124, the belt 92 is slack, and the drive shaft 82 remains stationary. When the mechanism is set up in the manner illustrated in Figs. 2, 3 and 4, the saw wires 6 will be fed into the stone S being cut in a series of short downward strokes. As long as the speed of the motor 130 remains constant, these feed strokes will occur at regular intervals.

The present invention provides for the regulation of the rate of downward movement of the saw wires 6 by controlling the length of the increments of downward movement which result from successive rotations of the crank 124 driven by the motor 130. Hence, the speed of the motor 130 may remain constant, and the effective rate of feed may be varied by altering the lengths of the increments of advance produced by each cycle of the motor. This is accomplished by varying the length of the path of movement of the rocker arm 94.

An abutment or stop element 132 is fixed to the upper end of a vertically movable control rod 134 in alignment with the path of movement of the rocker arm 94. A bracket 136 welded or otherwise secured rigidly to the movable platform 24 is provided with an elongated opening 138 therein for receiving and guiding the rod 134 during its vertical movements. A lug 140 is attached to the rod 134 above the bracket 136 in position to rest upon the upper end of an adjustment screw 142 which cooperates with a nut 144 secured to the bracket 136. When the screw 142 is rotated in a direction such as to cause it to move upwardly, the lug 140 transmits such movement to the control rod 134 and the abutment 132. Similarly, when the screw 142 is reversed, the abutment 132 will move downwardly. In Figs. 2, 3 and 4, the abutment 132 is below the path of the rocker arm 94, but the abutment 132 may be moved upwardly by manipulation of the adjustment screw 142 to bring it into contact with the lower edge of the rocker arm 94. Consequently, the vertical position of the abutment 132 determines the effective length of the path of movement of the rocker arm 94 under the influence of the motor 130.

The control rod 134 also carries a laterally extending block 146 which may pass through the elongated slot 138 in the bracket 136. If desired, the control rod 134 may be moved upwardly far enough to raise the lower end of the block 146 above the bracket 136, and then the control rod 134 may be shifted laterally in the elongated slot 138 to rest the block 146 upon the upper surface of the bracket 136. This is the position of the parts illustrated in Fig. 6 of the drawings.

The relationship between the vertical position of the abutment 132 and the length of the driving strokes of the rocker arm 94 will be clear from a comparison of Figs. 4 and 6. In Fig. 4, the abutment 132 is disposed beyond the end of the path of movement of the rocker arm 94, and it has no effect upon the length of the drive increments imparted to the drive shaft 82 by the rocker arm 94. In Fig. 6, however, the abutment 132 is elevated to such an extent that rotation of the crank 124 results in no movement of the rocker arm 94. In fact, when the rocker arm 94 is held in the position shown in Fig. 6, the throw of the crank 124 is insufficient to even tighten the belt 92.

As will be evident, the disposition of the abutment 132 at levels intermediate those shown in Figs. 4 and 6 will cause varying amounts of movement of the rocker arm 94 in response to the rotation of the crank 124. The net effect produced by the abutment 132 is a shortening of the path of movement of the rocker arm 94. When the path of movement of the rocker arm 94 is relatively long, the belt 92 will move a substantial distance over its pulley 86 during each cycle of the crank 124, but when the path of movement of the rocker arm 94 is shortened, the drive stroke also will be shortened.

By way of summary, it may be helpful to describe briefly the operations carried out by the wire saw shown in Fig. 1 in cutting a block of stone S. Initially, the movable frame unit will occupy an elevated position with respect to the uprights 16 and 18 so that the lower, cutting runs of the saw wires 6 will be above the level of the upper surface of the stone S. After the stone S has been positioned properly on the carriage 2 and the distribution blocks 70 for feeding the abrasive mixture to the stone S have been positioned on the stone S, the motor 12 may be energized to drive the saw wires along their endless paths extending around the guide wheels 8 and 10. Then the movable frame unit must be moved slowly down the uprights 16 and 18 to move the cutting runs of the saw wires 6 into the stone S.

During such downward movements of the movable frame unit, the motor 90 will be deenergized and the motor 130 will be energized. The initial setting of the feed-controlling abutment 132 normally will be based upon the judgment of a skilled operator, but, for purposes of illustration, let it be assumed that the abutment 132 initially is positioned as suggested in Figs. 2, 3 and 4. This is the position of the abutment 132 which permits the mechanism 60 to advance the saw wires 6 most rapidly into the stone S.

After the saw wires have been brought into contact with the stone S, the operator may find that the rate of feed or downward movement of the movable frame unit is too fast. If such is the case, it will be evident to the operator because the tension in the saw wires 6 will increase markedly and the lower cutting runs of the saw wires 6 will assume excessively bowed configurations. When the operator determines that the initial setting of the abutment 132 is permitting the saw wires 6 to move downwardly more rapidly than is desirable, he should actuate the adjustment screw 142 to elevate the abutment 132 to a level intermediate those suggested in Figs. 4 and 6.

When the abutment 132 is disposed at an intermediate level, the initial movements of the crank 124 from the position shown in Fig. 2 will have no effect upon either the engagement arm 104 or the rocker arm 94. In other words, the idle portion of the crank cycle is increased. It follows also that the effective length of the path of movement of the rocker arm 94 will be decreased by a corresponding amount and that the increments of advance of the saw wires 6 will be decreased.

If the first adjustment of the screw 142 does not result in a restoration of the proper conditions for the cutting operation being performed, additional adjustments can be made by the operator to bring about the desired result. It should be noted particularly that all of these adjustments may be carried out while the feed control mechanism 60 is in operation. There is no need to stop the machine in order to change the rate of feed. Moreover, in making the adjustments, it is not necessary for the operator to touch any of the moving parts of the feed control mechanism 60. The only manipulation which is required is the rotating of the adjustment screw 142.

During downward movements of the movable frame unit, the large pulley 84 on the drive shaft 82 of the feed control mechanism 60 will rotate in a clockwise direction as viewed in Fig. 2. This direction is contrary to the direction of rotation of the pulley 84 under the influence of the motor 90, but as mentioned above, the motor 90 will be deenergized during such movements so that the shaft of the motor 90 may turn as an idler.

After the stone S has been severed completely by the downward movements of the saw wires 6, the operator may inactivate the drive element or rocker arm 94 by shifting the control arm 134 to the position shown in Fig. 6. In this position, the block 146 fixed to the control arm 134 may rest upon the upper surface of the bracket 136 to hold the control arm 134 and the abutment 132 in their elevated positions.

After the abutment 132 has been moved upwardly to the position shown in Fig. 6, the belt 92 will be slack, and the small pulley 86 may be rotated relative to the belt 92. The motor 90 then may be actuated to elevate the movable frame unit of the machine rapidly. The rate of elevation need not be controlled closely, because no work is performed by the saw wires 6 during upward movements.

The elevation of the movable frame unit represents the last portion of an operating cycle of the wire saw. After completion of this operation, the stone S may be removed from the carriage 2 and the cycle may be repeated to cut another block of stone.

It will be evident to persons skilled in the art that the wire saw illustrated in Fig. 1 of the drawings represents only one of many possible applications of the feed control of this invention. Machines of the type shown in Fig. 1 commonly are referred to in the trade as "short wire" machines because the saw wires 6 are looped directly about the guide wheels 8 and 10. There are similar machines which are referred to as "long wire" machines and in which the saw wires may extend one hundred feet or more to one side of the main frame of the machine. The present invention is equally advantageous in both types of wire saw installations. It also may be applied to gang saws and the like, if desired.

Since the illustrated embodiment of the invention includes only one drive element or rocker arm 94, it can be employed to regulate the rate of feed in only one direction. It is recognized that this limitation would make the illustrated embodiment unsuitable for use in some applications. However, the limitation can be overcome readily by the simple expedient of duplicating certain of the parts of the mechanism. For example, another pulley may be fixed to the drive shaft 82 in front of the pulley 86 and in position to cooperate with a belt driven by a second rocker arm on the shaft 96. The second rocker arm would be driven by a telescoping linkage extending between the crank 124 and the right end (as viewed in Fig. 2) of the second rocker arm. With such an arrangement, one rocker arm would serve as a drive element for rotating the drive shaft 82 in one direction, and the other rocker arm would drive the shaft 82 in the opposite direction. For most applications, one or the other of the rocker arms would be inactivated at any given time, so that the effect produced by one would not be immediately counteracted by the other.

Still other modifications and variations of the invention will suggest themselves to persons skilled in the art. It is intended therefore that the foregoing detailed description of the illustrated embodiment of the invention be considered as exemplary only, and that the scope of this invention be ascertained from the following claims.

We claim:

1. In a wire saw having means for supporting the work to be cut, a stationary frame, a movable frame carried by said stationary frame, at least one saw wire mounted on said movable frame for movement along a path extending across said work supporting means, a rotatable shaft on one of said frames, and means connecting said shaft to the other of said frames so that rotation of said first shaft causes said movable frame to move relative to said stationary frame, the improvement which comprises a power source, an oscillatable element on said one frame driven by said power source, means connecting said oscillatable element to said rotatable shaft for causing rotation of said shaft during a portion only of each cycle of said oscillatable element, and an abutment adjustably mounted on said one frame and cooperating with the last-mentioned means to regulate the amount of rotation imparted to said shaft during each cycle of said oscillatable element.

2. A drive mechanism for feeding a tool toward a workpiece in a series of steps of adjustable length comprising a frame, a rotatable shaft on said frame, means for connecting said shaft to the tool so that the tool moves toward the work upon rotation of said shaft in one direction, a drive element movable back and forth along a predetermined path, an abutment adjustably mounted on said frame in alignment with the path of said drive element and being adapted to contact said drive element to limit movement of said drive element toward one end of said path so as to vary the effective length of said path, power means for causing said drive element to move back and forth along said path to the extent permitted by said abutment, and means operatively connected to said shaft and said drive element for rotating said shaft in said one direction upon each movement of said drive element in one direction along its path while permitting said shaft to remain stationary during movement of said drive element in the opposite direction along its path.

3. In stone sawing apparatus having means for supporting the stone to be cut, a stationary frame, a movable frame carried by said stationary frame and at least one saw wire mounted on said movable frame for movement along a path extending across said work supporting means, the improvement which comprises a drive mechanism for intermittently moving said movable frame relative to said stationary frame in a direction such as to feed said saw wire into the stone in a series of steps of regulatable length, said mechanism including a rotatable shaft on one of said frames, means operatively connecting said shaft to the other of said frames so as to cause relative movement between said frames upon rotation of said shaft, a rocker arm pivotally mounted on said one frame for swinging movements about its pivotal axis, means operatively connecting said rocker arm to said shaft for rotating said shaft during swinging movements of said rocker arm in one direction only, a motor on said one frame, linkage means connecting said motor to said rocker arm for causing said rocker arm to swing back and forth, and an abutment adjustably mounted on said one frame adjacent said rocker arm for limiting the lengths of the swinging movements imparted to said rocker arm by said linkage means.

4. In stone sawing apparatus having means for supporting the stone to be cut, a stationary frame, a movable frame carried by said stationary frame, and at least one saw wire mounted on said movable frame for movement along a path extending across said work supporting means, the improvement which comprises a drive mechanism for intermittently moving said movable frame relative to said stationary frame in a direction such as to feed said saw wire into the stone in a series of steps of regulatable length, said mechanism including a rotatable shaft on one of said frames, means operatively connecting said shaft to the other of said frames so as to cause relative movement between said frames upon rotation of said shaft, a rocker arm pivotally mounted on said one frame for swinging movements about its pivotal axis, means operatively connecting said rocker arm to said shaft for rotating said shaft during swinging movements of said rocker arm in one direction only, a motor on said one frame, linkage means connecting said motor to said rocker arm for causing said rocker arm to swing back and forth, an abutment adjustably mounted on said one frame adjacent said rocker arm for limiting the lengths of the swinging movements imparted to said rocker arm by said linkage means, and stop means connected to said abutment and cooperating with said one frame when said abutment has been moved to a position such that no motion is imparted to said rocker arm by said linkage means to hold said abutment in such position so as to inactivate the mechanism without deenergizing said motor.

5. In stone sawing apparatus having means for supporting the stone to be cut, a stationary frame, a movable frame carried by said stationary frame and at least one saw wire mounted on said movable frame for movement along a path extending across said work supporting means, the improvement which comprises a drive mechanism for moving said movable frame relative to said stationary frame so as to feed said saw wire into the stone and remove it from the stone, said drive mechanism including a rotatable shaft on one of said frames, means operatively connecting said shaft to the other of said frames so as to cause relative movement between said frames upon rotation of said shaft, a first motor operatively connected to said shaft, said first motor being adapted when energized to drive said shaft in a direction to cause said saw wire to move away from the stone and being adapted when deenergized to turn as an idler upon rotation of said shaft, a drive element mounted on said one frame for movement back and forth along a predetermined path, means operatively connected to said drive element and said shaft for driving said shaft in a direction to cause said saw wire to move toward the stone upon each movement of said drive element in one direction along its path while permitting said shaft to remain stationary during movements of said drive element in the opposite direction, an abutment adjustably mounted on said one frame in alignment with said drive element for controlling the length of its path, and a second motor operatively connected to said drive element for causing said drive element to move back and forth along its path to the extent permitted by said abutment.

6. In a drive mechanism having a frame and a rotatable output shaft on said frame, the improvement which comprises a pulley fixed to said shaft, a rocker arm pivotally mounted on said frame for swinging movements about its pivotal axis, an engagement arm pivotally mounted on said rocker arm, means connected to said engagement arm for moving said engagement arm about its pivot relative to said rocker arm and for driving said rocker arm about its pivot relative to said frame, and a flexible band passing around a portion of the periphery of said pulley and being connected at one end to said rocker arm and being connected at its other end to said engagement arm, the length of said band being such that it is taut to frictionally engage said pulley when said engagement arm is in one angular position relative to said rocker arm and slack to loosely engage said pulley when said engagement arm is in another angular position relative to said rocker arm.

7. In a drive mechanism having a frame and a rotatable output shaft on said frame, improvement which comprises a pulley fixed to said shaft, a rocker arm pivotally mounted on said frame for swinging movements about its pivotal axis, an engagement arm pivotally mounted on said rocker arm, means connected to said engagement arm for moving said engagement arm about its pivot relative to said rocker arm and for driving said rocker arm about its pivot relative to said frame, a flexible band passing around a portion of the periphery of said pulley and being connected at one end to said rocker arm and being connected at its other end to said engagement arm, the length of said band being such that it is taut to frictionally engage said pulley when said engagement arm is in one angular position relative to said rocker arm and slack to loosely engage said pulley when said engagement arm is in another angular position relative to said rocker arm, an abutment carried by said frame in alignment with the path of movement of said rocker arm for movement toward and away from said rocker arm, and screw means on said frame for controlling the position of said abutment.

8. In stone sawing apparatus having means for supporting the stone to be cut, a stationary frame, a movable frame carried by said stationary frame and at least one saw wire mounted on said movable frame for movement along a path extending across said work supporting means, the improvement which comprises a drive mechanism for moving said movable frame relative to said stationary frame so as to move said saw wire toward and away from the stone, said mechanism including a rotatable shaft on one of said frames, means operatively connecting said shaft to the other of said frames so as to cause relative movement between said frames upon rotation of said shaft, a first motor operatively connected to said shaft to rotate said shaft when said motor is energized, a rocker arm pivotally mounted on said one frame for swinging movements about its pivotal axis, means operatively connecting said rocker arm to said shaft for rotating said shaft only during swinging movements of said rocker arm in one direction and permitting independent movements of said shaft and said rocker arm at other times, a second motor on said one frame, means connecting said second motor to said rocker arm for causing said rocker arm to swing back and forth, and an abutment adjustably mounted on one of said frames adjacent said rocker arm for limiting the lengths of the swinging movements imparted to said rocker arm by the last-mentioned means.

9. A drive mechanism for feeding a tool toward a workpiece in a series of steps of adjustable length and for returning the tool comprising a frame, a rotatable shaft on said frame, means for connecting said shaft to the tool so that the tool moves toward the work upon rotation of said shaft in one direction, a motor connected to said shaft for rotating said shaft in the opposite direction when said motor is energized, a drive element movable back and forth along a predetermined path, an abutment adjustably mounted on said frame in alignment with the path of said drive element and being adapted to contact said drive element to limit movement of said drive element toward one end of said path so as to vary the effective length of said path, power means for causing said drive element to move back and forth along said path to the extent permitted by said abutment, and means operatively connected to said shaft and said drive element for rotating said shaft in said one direction upon each movement of said drive element in one direction along its path while permitting said shaft to remain stationary during movement of said drive element in the opposite direction along its path.

10. A drive mechanism for feeding a tool toward a workpiece in a series of steps comprising a frame, a rotatable shaft on said frame, a pulley fixed to said shaft, means connecting said shaft to the tool so that the tool moves toward the work upon rotation of said shaft in one direction, a rocker arm pivotally mounted on said frame for swinging movements about an axis displaced from the axis of rotation of said pulley, an engagement arm pivotally mounted on said rocker arm for swinging movements about an axis displaced from the pivotal axis of said rocker arm, a flexible band passing around a portion of the periphery of said pulley and being connected at one end to said rocker arm and being connected at its other end to said engagement arm, the length of said band being such that it bears tightly against said pulley in a first angular position of said engagement arm relative to said rocker arm and is loose on said pulley in a second angular position of said engagement arm relative to said rocker arm, and oscillating means connected to said engagement arm for moving said engagement arm about its pivot relative to said rocker arm and for driving said rocker arm about its pivot relative to said frame, whereby movement of said oscillating means in one direction swings said engagement arm to said first angular position so as to tighten said band into driving engagement with said pulley during movement of said rocker arm in one direction and movement of said oscillating means in the opposite direction permits movement of said engagement arm to said second angular position so as to loosen said band and permit relative movement between said band and said pulley during movement of said rocker arm in the opposite direction.

11. A drive mechanism for feeding a tool toward a workpiece in a series of steps of adjustable length comprising a frame, a rotatable shaft on said frame, a pulley fixed to said shaft, means connecting said shaft to the tool so that the tool moves toward the work upon rotation of said shaft in one direction, a rocker arm pivotally mounted on said frame for swinging movements about an axis displaced from the axis of rotation of said pulley, an abutment adjustably mounted on said frame in position to contact said rocker arm to limit the swinging movements of said rocker arm, an engagement arm pivotally mounted on said rocker arm for swinging movements about an axis displaced from the pivotal axis of said rocker arm, a flexible band passing around a portion of the periphery of said pulley and being connected at one end to said rocker arm and being connected at its other end to said engagement arm, the length of said band being such that it bears tightly against said pulley in a first angular position of said engagement arm relative to said rocker arm and is loose on said pulley in a second angular position of said engagement arm relative to said rocker arm, and oscillating means connected to said engagement arm for moving said engagement arm about its pivot relative to said rocker arm and for driving said rocker arm about its pivot relative to said frame, whereby movement of said oscillating means in one direction swings said engagement arm to said first angular position so as to tighten said band into driving engagement with said pulley during movement of said rocker arm in one direction and movement of said oscillating means in the opposite direction permits movement of said engagement arm to said second angular position so as to loosen said band and permit relative movement between said band and said pulley during movement of said rocker arm in the opposite direction.

References Cited in the file of this patent
UNITED STATES PATENTS

| | | |
|---|---|---|
| 1,331,828 | Strohl | Feb. 24, 1920 |
| 2,080,665 | Larsen | May 18, 1937 |
| 2,674,238 | Dessureau et al. | Apr. 6, 1954 |